March 23, 1965 J. K. GILBERT 3,174,250
ANIMAL TRAPS
Filed Jan. 30, 1962 3 Sheets-Sheet 1

JAMES K. GILBERT,
INVENTOR.

BY Donald E. Windle
ATTORNEY.

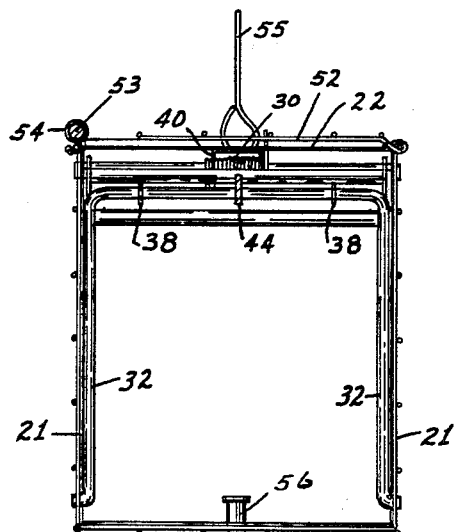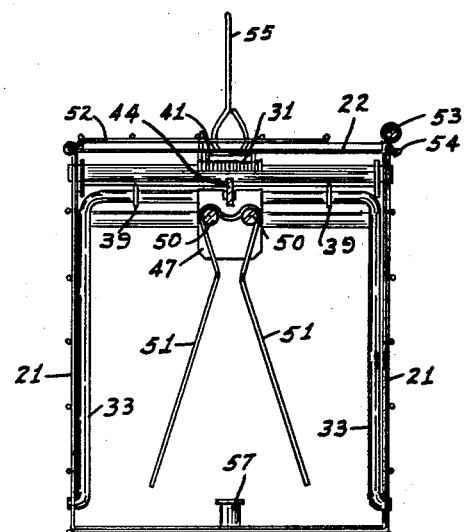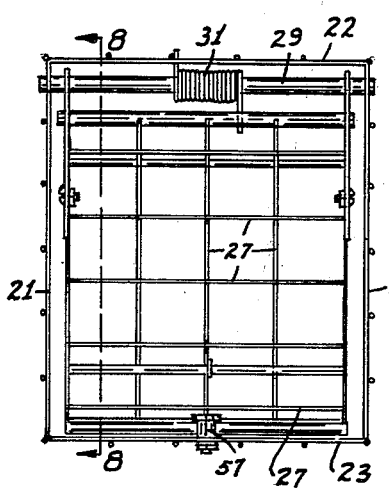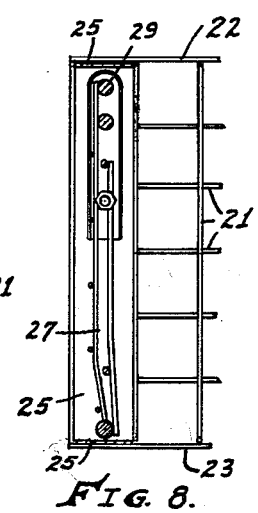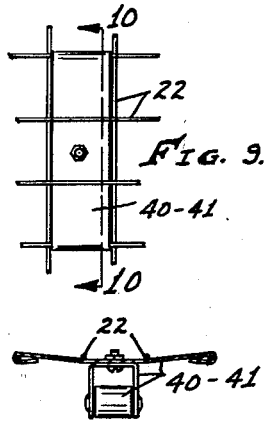

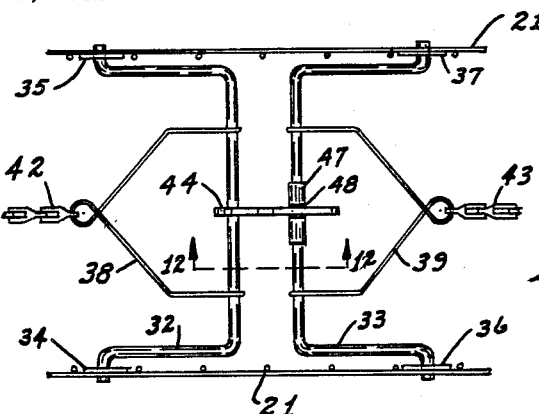
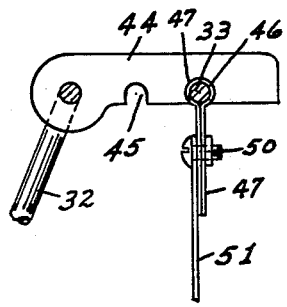
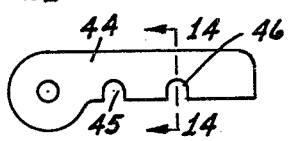
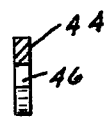
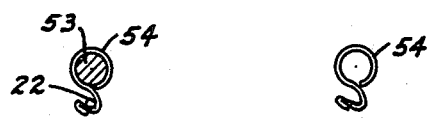
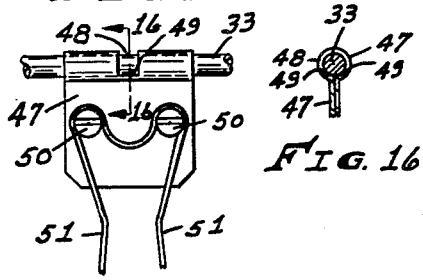
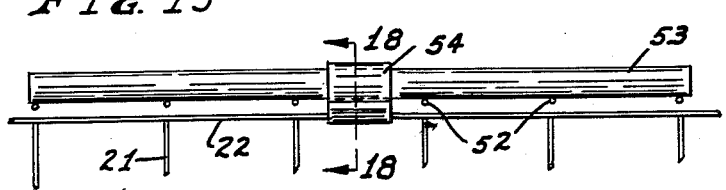
JAMES K. GILBERT, INVENTOR
BY Donald E. Windle
ATTORNEY.

United States Patent Office 3,174,250
Patented Mar. 23, 1965

3,174,250
ANIMAL TRAPS
James K. Gilbert, 1514 Indiana Ave., Connersville, Ind.
Filed Jan. 30, 1962, Ser. No. 169,842
4 Claims. (Cl. 43—61)

Animal traps, as such, are recognized to be old in the art. However, improvements have been made therein from time to time.

It is the principal object of the present invention to provide an improved version in which the operation thereof is positive.

A second object is the provision of an animal trap comprising a straight-through passage to be closed at each end thereof when the trigger thereof is tripped, and with the closures at the ends being operated and closed simultaneously.

A third object is the provision of an animal trap having an opening in the top thereof with the hinged closure therefor being latched by a novel means.

A further object is the provision of an animal trap which is adaptable for use either under water, in passageways, or on the ground.

Other particular objects and advantages of the invention will suggest themselves in the course of the following description, and that which is new will be pointed out in the appended claims.

The presently-preferred and most satisfactory manner of carrying out the principles of the invention in a practical and efficient manner is shown in the accompanying drawings forming a part thereof, in which:

FIGURE 5 is a detail vertical section through the trap, taken on line 5—5 of FIGURE 4.

FIGURE 6 is also a detail vertical section through the trap, as taken on line 6—6 of FIGURE 4.

FIGURE 7 is an end view of the trap, taken from line 7—7 of FIGURE 1.

FIGURE 8 is a detail vertical section through one of the closure members, with the same being taken on line 8—8 of FIGURE 7.

FIGURE 9 is a top plan of an idler roller-supporting member.

FIGURE 10 is a detail elevation of one of the idler rollers and its supporting member.

FIGURE 11 is a top plan view of the tripping mechanism, taken from line 11—11 of FIGURE 4.

FIGURE 12 is a side elevation of the tripping members, taken from line 12—12 of FIGURE 11.

FIGURE 13 is a detail elevation of the latch member of the tripping device.

FIGURE 14 is a detail vertical section through the latch member.

FIGURE 15 is an elevational view of the latch tripping member.

FIGURE 16 is a detail vertical section through a portion of the latch tripping member, taken on line 16—16 of FIGURE 15.

FIGURE 17 is a detail elevation of the top closure latching device.

FIGURE 18 is a detail vertical section through the top closure latching device, taken on line 18—18 of FIGURE 17.

FIGURE 19 is a detail side elevation of the top closure latching member, per se.

Like characters of reference designate like parts throughout the several views of the drawings.

Figure 1:
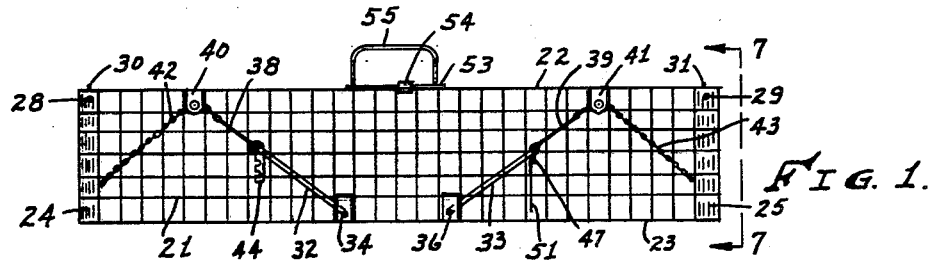
FIGURE 1 is a side elevation of an animal trap embodying the features of the invention.
Figure 2:
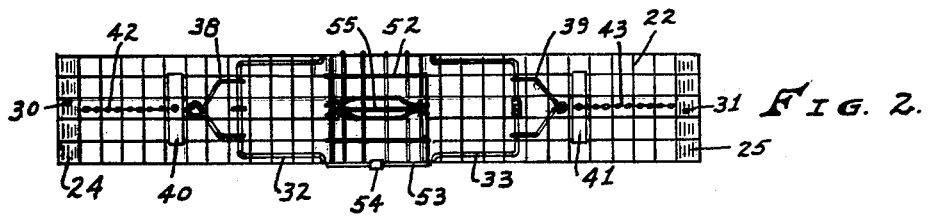
FIGURE 2 is a top plan view of the trap.

In order that the construction and the operation of the invention may be more fully understood and appreciated, I will now take up a detailed description thereof in which the same will be described more fully and comprehensively.

Referring now to the drawings in detail, numerals 21 designate the sides of the trap with the same being formed of suitable wire mesh. Numerals 22 designate the top of the device which is formed of a continuation of the sides and also being formed of wire mesh. The bottom 23 is a further continuation of the wire mesh forming the sides 21 and the top 22.

24 and 25 designate closure frame members which are formed of sheet metal and are four-sided and secured at the respective ends of the trap, as more clearly shown in FIGURES 1, 2, 3, 4 and 8. A closure 26 is hingedly secured in frame 24 and closure 27 is hingedly secured in frame 25. Closures 26 and 27 are hung on respective rods 28 and 29 with each end of each rod 28 and 29 extending through the respective frame member 24 and 25. Each of the closures 26 and 27 is formed of wire mesh and is spring-urged to closed position by means of a respective spring 30 and 31, with each of the springs being mounted on the respective rods 28 and 29. One end of each of the springs 30 and 31 projects upwardly through the head member of its respective frame, and with the other end thereof extending downwardly and through a member of the closure construction. Each of the closure members is adapted to swing into the trap, as more clearly shown in FIGURE 4.

I have provided a pair of yoke-shaped brackets 32 and 33 as a part of the tripping mechanism. Each of the members 32 and 33 has two oppositely-disposed end portions formed thereon, with each of the end portions projecting outwardly and being journalled in respective journals 34, 35, 36 and 37. Bracket 32 is journalled in the journals 34 and 35 while bracket 33 is journalled in journals 36 and 37 and with each of the brackets being pivotally supported in their respective journals.

I have provided a chain-securing stirrup 38 on bracket 34 and a chain-securing stirrup 39 on bracket 35. The stirrups 38 and 39 are swingably secured on the respective brackets 34 and 35.

I further provide idler assemblies 40 and 41 and locate assembly 40 between bracket 32 and closure member 26 with the same being secured to the top 22 of the trap. Likewise, idler assembly 41 is secured to the top 22 and is located between bracket 33 and closure 27.

A chain 42 is secured, at one end thereof, to stirrup 38 and extends through idler assembly 40, with the opposite end thereof being secured to closure 26. A chain 43 has one end thereof secured to stirrup 39, with the same running through idler 41, and with the opposite end thereof being secured to closure 27.

A trigger latch 44 is positioned on bracket 32 and with the same being loosely fitted thereon. A pair of bracket-receiving notches 45 and 46 are formed in one edge of the latch 44 for engagement with bracket 33. Either of the notches 45 and 46 may be engaged with bracket 33, depending on the length of the chains.

A trigger 47 is loosely formed about bracket 33 and is swingable thereon. A notch 48 is formed in the trigger 47, with the notch being formed of a width slightly greater than the thickness of latch member 44, and with the notch having shoulders 49 formed at the bottom thereof. The trigger is preferably formed of sheet metal with the same being lapped and secured together by means of bolts 50. A trigger lever 51 has its upper end formed to fit under the heads of bolts 50, with the lower ends thereof being spread and depending from the trigger 47.

The trap is provided with a top closure 52 hingedly secured to one of the longitudinal edges of the top 22. The opposite or latch edge of the top closure 52 has a bar 53 secured thereto. A latch member 54 is provided to secure the top closure member in closed position. The latch 54 is preferably formed of sheet metal in the form of an S with one portion thereof being formed about the bar 53, and with the other portion being formed to engage the adjacent edge of the top 22, as shown in FIGURES 17 and 18. A handle 55 is provided on the top closure by which the closure may be opened or closed, and by which the trap may be carried.

A stop 56 is provided in the bottom of closure frame 24 with a similar stop 57 being provided in the bottom of closure frame 25. The stops 56 and 57 provide means against which the respective closures 26 and 27 are stopped in their closing movements.

*Operation*

Figure 3:
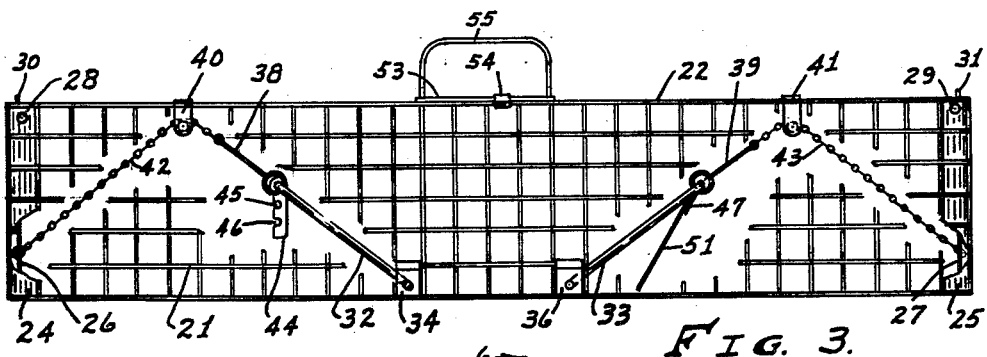
FIGURE 3 is an enlarged side elevation of the trap similar to that shown in FIGURE 1, but with certain portions thereof being broken away to better show the parts thereof with more clearness, and with the parts thereof being shown in a sprung or released condition.
Figure 4:
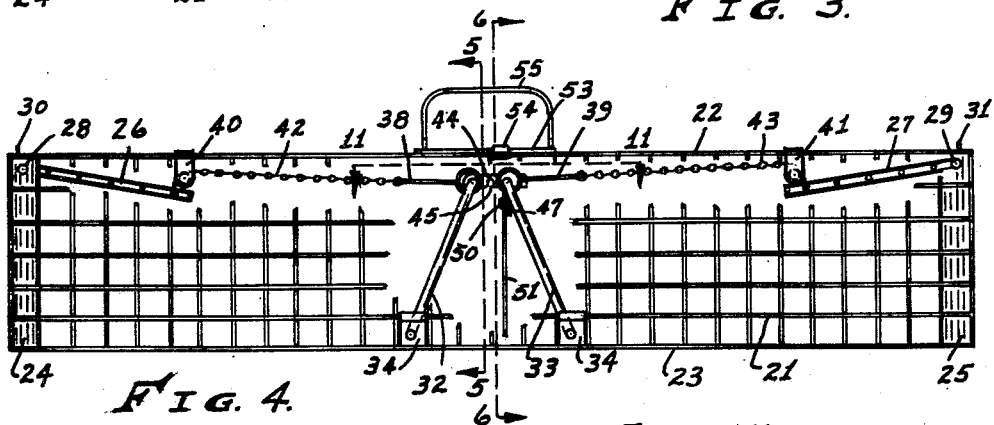
FIGURE 4 is also a side elevation similar to that shown in FIGURE 3, but with the parts thereof being shown in "set" condition.

In setting the trap, the top closure is unlatched and opened, permitting one to reach into the trap and bring the two brackets 32 and 33, from the position shown in FIGURE 3 to the position shown in FIGURE 4, toward each other until one of the notches 45 or 46 in the latch 44 can engage the bracket 33 in the notch 48 of trigger 47, and with the noch 45 or 46 seating on the top of the bracket 33, as more clearly shown in FIGURE 11. When the notch 45 or 46 is seated on the bracket 33, the adjacent bottom surfaces of latch 44 being in engagement or nearly so with the shoulders 49 of the trigger 47. When the brackets 32 and 33 are brought toward each other, the end closures 26 and 27 are opened by means of the respective chains 38 and 39. When the trap is in set position, the trigger lever is positioned substantially vertically and depending from the trigger 47, as shown in FIGURE 4.

When an animal enters the trap from either end and proceeds toward the opposite end of the trap, the animal engages the trigger lever 51 which causes the trigger to rotate slightly on the bracket 33 and engage the adjacent under surface of the trigger latch 44. Rotation of the trigger brings the respective shoulder 49 of the trigger 47 against the under side of the latch 44 and dislodges the latch from its engagement with the bracket 33. Springs 30 and 31 actuate the respective end closures 26 and 27 to their closed positions and against the respective stops 56 and 57.

It is to be noted, from the construction of the trap, that animals caught in the trap are not injured or mutilated. Should the trap be set under water, animals caught therein will drown without being mutilated.

While the invention has been shown and described in its presently-preferred form, I desire that it be understood that minor changes may be made therein insofar as the changes therein may fall within the scope and spirit of the appended claims.

Having now shown and described the invention, what I claim and desire to secure by Letters Patent of the United States, is:

1. An animal trap comprising an elongated passageway composed of sides and top and bottom and terminating in an opening at each end thereof, a spring-urged closure swingably secured in the opening at each end of the passageway, a pair of pivotally-mounted spaced-apart yoke-shaped brackets positioned in the elongated passageway, a flexible means secured to each of the yoke-shaped brackets and connected with a respective closure, a keeper device pivotally positioned on one of the yoke-shaped brackets and having a portion adapted to releasably engage the second yoke-shaped bracket for holding each of the closures in an open position, and a trigger device providing means for releasing said keeper from engagement with said second yoke-shaped bracket thereby releasing both of the spring-urged end closures from their open positions simultaneously.

2. An animal trap comprising an elongated wire mesh passageway having an opening formed at each end thereof, spring-urged closures for closing the open ends, each of said spring-urged closures being hinged to the top of the passageway at its ends, a fixed closure stop member being provided at the lower edge of the passageway and located exteriorly of each of said spring-urged closures and at the lower edge thereof, yoke-shaped brackets being pivotally connected to a wall of the passageway, flexible means connecting one of said brackets to one of said closures and the other of said brackets to the other closure, a releasable keeper coupling the yoke-shaped brackets toward each other and holding the closures in open position through the flexible means, a trigger secured to and suspended from one of the yoke-shaped brackets, and with a tripping action of the trigger releasing the yoke-shaped brackets from the keeper and permitting both closures to close simultaneously.

3. In an animal trap comprising an elongated mesh passageway having an opening formed in each end thereof, a spring-urged closure mounted in each end of the passageway and hinged to an upper wall portion of the passageway, a closure stop member rigidly secured to each end at the bottom of the passageway and providing a stop limiting the closing movement of the respective closure, a pair of oppositely-disposed yoke-shaped pivotally-mounted brackets located substantially midway of the length of the passageway, a flexible connector coupling each of the yoke-shaped brackets with a respective closure, a trigger device pivotally mounted on one of the yoke-shaped brackets, a keeper connected to the other of said yoke-shaped brackets and releasably engaging said one yoke-shaped bracket, and with the tripping movement of the trigger providing means releasing the keeper and permitting both of the end closures to close simultaneously from their open positions.

4. In an animal trap, a wall structure comprising an elongated passageway having open ends, a closure having spring-urged means located at each open end of the passageway with each closure being top hinged at a respective end of the passageway, a pair of oppositely-disposed yoke-shaped brackets pivotally mounted within the passageway and located in spaced-apart relation substantially midway between the end closures, flexible means connecting each of the brackets with a respective spring-urged closure, a keeper member swingably mounted on one of the yoke-shaped brackets and releasably secured to the other yoke-shaped bracket, said spaced-apart pivot-mounted brackets being capable of swinging toward and away from each other, a trigger member swingably mounted on said other of the brackets with disturbance of the trigger member providing means releasing the keeper member and permitting both of the closures to close simultaneously.

References Cited by the Examiner
UNITED STATES PATENTS

| 884,380 | 4/08 | Hadley | 43—61 |
| 1,625,027 | 4/27 | Hulse | 43—61 |
| 1,913,823 | 6/33 | Witte | 43—61 |
| 2,947,107 | 8/60 | Lehn | 43—92 |

ABRAHAM G. STONE, *Primary Examiner.*